United States Patent
Nice et al.

(10) Patent No.: US 9,348,898 B2
(45) Date of Patent: May 24, 2016

(54) RECOMMENDATION SYSTEM WITH DUAL COLLABORATIVE FILTER USAGE MATRIX

(71) Applicant: Microsoft Corporation, Redmond, WA (US)

(72) Inventors: Nir Nice, Kfar Veradim (IL); Noam Koenigstein, Raanana (IL); Ulrich Paquet, Cambridge (GB); Shahar Keren, Hemed (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 220 days.

(21) Appl. No.: 14/227,095

(22) Filed: Mar. 27, 2014

(65) Prior Publication Data

US 2015/0278350 A1    Oct. 1, 2015

(51) Int. Cl.
- *G06F 17/30* (2006.01)
- *G06Q 30/02* (2012.01)
- *G06Q 30/06* (2012.01)

(52) U.S. Cl.
CPC .......... *G06F 17/30699* (2013.01); *G06Q 30/02* (2013.01); *G06Q 30/0631* (2013.01)

(58) Field of Classification Search
USPC .................................................. 707/748, 754
See application file for complete search history.

(56) References Cited

U.S. PATENT DOCUMENTS

| | | | |
|---|---|---|---|
| 6,615,208 B1 * | 9/2003 | Behrens | G06F 17/3069 707/754 |
| 7,152,031 B1 * | 12/2006 | Jensen | G06F 17/2785 704/1 |
| 7,222,126 B2 * | 5/2007 | Wolman | G06K 9/6251 707/748 |
| 7,526,458 B2 | 4/2009 | Flinn et al. | |
| 7,685,232 B2 | 3/2010 | Gibbs et al. | |
| 7,756,879 B2 | 7/2010 | Parsons et al. | |

(Continued)

FOREIGN PATENT DOCUMENTS

| | | |
|---|---|---|
| GB | 2447868 A | 10/2008 |
| WO | 2013025460 A1 | 2/2013 |
| WO | 2013054299 A1 | 4/2013 |

OTHER PUBLICATIONS

Tang, et al., "Scaling Matrix Factorization for Recommendation with Randomness", In Proceedings of the 22nd International Conference on World Wide Web Companion, May 13, 2013, 2 pages.

(Continued)

*Primary Examiner* — Cam-Linh Nguyen
(74) *Attorney, Agent, or Firm* — Aaron Chatterjee; Judy Yee; Micky Minhas

(57) ABSTRACT

Example apparatus and methods perform matrix factorization (MF) on a usage matrix to create a latent space that describes similarities between users and items and between items and items in the usage matrix. The usage matrix relates users to items according to a collaborative filtering approach. A cell in the usage matrix may store a value that describes whether a user has acquired an item and the strength with which the user likes an item that has been acquired. The latent item space may reflect true relationships between items represented in the usage matrix and those relationships may be proportional to the strength in the usage matrix. The strength of the relationship may be encoded using continuous data that measures, for example, the amount of time a video game has been played, the amount of time content has been viewed, or other continuous or cumulative engagement measurements.

20 Claims, 10 Drawing Sheets

(56) References Cited

U.S. PATENT DOCUMENTS

| | | | |
|---|---|---|---|
| 8,131,732 B2 | 3/2012 | Yu et al. | |
| 8,429,175 B2 | 4/2013 | Lidstrom et al. | |
| 8,775,365 B2* | 7/2014 | Hatami-Hanza | G06F 17/30 707/603 |
| 8,793,312 B2* | 7/2014 | Tao | G06Q 30/0251 709/204 |
| 9,147,012 B2* | 9/2015 | Gaude | G06F 17/30867 |
| 9,183,510 B1* | 11/2015 | Walti | G06N 99/005 |
| 2002/0107853 A1* | 8/2002 | Hofmann | G06F 17/30699 |
| 2007/0106491 A1* | 5/2007 | Carter | G06F 17/277 704/4 |
| 2007/0106651 A1* | 5/2007 | Isaacson | G06K 9/627 |
| 2009/0265404 A1* | 10/2009 | Tzeng | G06F 17/16 708/208 |
| 2010/0030764 A1* | 2/2010 | Koren | G06Q 30/0201 705/7.29 |
| 2010/0318427 A1* | 12/2010 | Miranda | G06F 17/30867 705/14.66 |
| 2013/0124449 A1 | 5/2013 | Pinckney et al. | |
| 2013/0204825 A1 | 8/2013 | Su | |
| 2013/0211950 A1 | 8/2013 | Nice et al. | |
| 2014/0074639 A1* | 3/2014 | Tian | G06Q 30/0631 705/26.1 |
| 2014/0121985 A1* | 5/2014 | Sayood | G06F 19/24 702/19 |
| 2014/0181121 A1* | 6/2014 | Nice | G06F 17/16 707/748 |
| 2015/0112801 A1* | 4/2015 | Nice | G06Q 30/0269 705/14.53 |
| 2015/0153476 A1* | 6/2015 | Prange | E21B 43/00 703/2 |
| 2015/0193548 A1* | 7/2015 | Nice | G06F 17/30876 707/748 |

OTHER PUBLICATIONS

International Search Report and Written Opinion Issued in PCT Application No. PCT/US2015/022104, Mailed Date: Jun. 15, 2015, 10 Pages.

Koren, et al., "Matrix Factorization Techniques for Recommender Systems", In IEEE Computer Society, vol. 42, Issue No. 8, Aug. 1, 2009, pp. 30-37.

* cited by examiner

RECOMMENDATION SYSTEM WITH DUAL COLLABORATIVE FILTER USAGE MATRIX

BACKGROUND

Conventional recommendation systems provide information about matches between users (e.g., shoppers) and items (e.g., books, videos, games) based on user interests, preferences, history, or other factors. For example, if a system has data that a user has previously accessed (e.g., purchased, rented, borrowed, played) a set of items, then a recommendation system may identify similar items and recommend them to the user based on the data about the user's own actions (e.g., "if you liked this, you might like that").

There are two major types of conventional recommendation systems: collaborative filtering based systems, and feature based systems. Collaborative filtering depends on actual user events (e.g., user who bought/watched/read an item). Matrix factorization over collaborative filters is regarded as providing superior results for a recommendation system. Matrix factorization over collaborative filters may employ two different techniques based on the type of data available. The type of data available may be binary (e.g., 0/1), one-sided (e.g., positive only), an explicit rating (e.g., 5 star scale), may be continuous, continuous within a range, or may have other forms. Binary or one-sided data allows embedding of items in a latent space so that the embedding reflects true relationships between items. For example, items that are similar to each other will be located near each other. Explicit rating data allows the use of multi-level and even continuous data but at the cost of losing the true item-item relationship where items that are similar to each other are located close to each other. Maintaining the item-item relationship may facilitate generating worthwhile recommendations.

Conventional matrix factorization models map users and items to a joint latent factor space and model user-item interactions as inner products in the joint latent factor space. An item may be associated with an item vector whose elements measure the extent to which the item possesses some factors. Similarly, a user may be associated with a user vector whose elements measure the extent of interest the user has in items that are high in corresponding factors. The dot product of the vectors may describe the interaction between the user and item and may be used to determine whether to make a recommendation to a user. More specifically, every user i may be assigned a vector $u_i$ in a latent space, and every item j may also be assigned a vector $v_j$ in the latent space, i and j being integers. The dot product $u_i \cdot v_j$ represents the score between the user i and the item j. The score represents the strength of the relationship between the user i and the item j and may be used to make a recommendation (e.g., recommend item with highest score). Conventional systems may rely on either binary data or on non-binary (e.g., multi-valued) data but not both when creating the data or latent item space upon which a recommendation is based.

When computing recommendations for a specific user i using matrix factorization, all the items j in the catalog may be scored. Typically, matrix factorization requires that there be some positive scores and some negative scores, otherwise the solutions may be trivial and of no practical use. Systems where, for example, users provide a discrete value (e.g., numerical score, number of stars) for an item may be well suited to matrix factorization. However, users typically only provide ratings for items they have accessed. Similarly, in binary usage systems, there may only be positive indications (e.g., indication that user watched a movie, indication that user played a game, indication that user read a book). There may not be any strength associated with a like and there may not be any negative indications (e.g., user did not watch movie, user did not play game, user did not read book, user did not access/acquire/use item). Thus, in either binary or non-binary systems, data may not be available for all combinations of i and j, and, only one type of data (e.g., binary, one-sided, discrete, continuous) may be considered. Discrete data refers to data that may take on or have a finite or countably infinite number of values. Continuous data may take on any value within a range. Discrete data may be produced by counting, continuous data may be produced by measuring.

After all the items j have been scored, the highest scoring items may be selected and recommended. This may be represented as: given i, find j=arg max $u_i \cdot v_j$. In mathematics, arg max is the argument of the maximum, which is defined as the set of points of the given argument for which the given function attains its maximum value.

$$\operatorname*{argmax}_x f(x) := \{x \mid \forall y: f(y) \le f(x)\}$$

In other words, arg $\max_x f(x)$ is the set of values of x for which f(x) attains its largest value M. For example, if f(x) is $1-|x|$, then it attains its maximum value of 1 at x=0 and only there, so arg $\max_x (1-|x|)=\{0\}$.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods perform matrix factorization over collaborative filters that provide both dislike/like (dis-like) data and strength-of-like data. In different embodiments, the dis-like data may be binary or single-sided data and may simply indicate whether a user "liked" (e.g., played, read, watched, purchased, accessed) an item. In different embodiments, the strength-of-like data may be continuous or may be discrete and may indicate the degree to which the user liked the item. The strength of a like may be an explicit rating (e.g., number of stars) or an implicit rating (e.g., number of hours played). The number of stars may be a discrete value (e.g., 2 stars out of 5). The number of hours played may be a continuous value (e.g., 117.3 hours). Example apparatus and methods employ both dis-like and strength-of-like signals together in a single model. Using both types of data in a single model produces improved recommendations compared to models that only use a single type of data. Improved recommendations are produced because the latent item based representation is more accurate when based on both binary and continuous data. Improved recommendations are also produced because improved latent item based representation facilitates understanding the true item-item relationships better.

In one example, an apparatus includes a memory that stores data concerning a user's activity. The activity data may include both a binary indication (e.g., 0/1, dislike/like) and a strength associated with the relationship indicated by the binary indication. The apparatus may generate a latent space based item model in which the relationships between items is truly represented. The apparatus may also generate a latent space based item model in which the relationship between items is proportional to the continuous data. The apparatus may build a single model from the binary data and the continuous data.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods provide a recommendation system that produces a latent item space from data in a collaborative filter based dual usage matrix. The dual collaborative filter data may facilitate factoring, for example, continuous user engagement. Example apparatus and methods may process a usage matrix that includes both dis-like data, which may be binary or one-sided, and strength-of-like data, which may be discrete or continuous. Using the dis-like (e.g., binary, one-sided) data facilitates preserving true item-item relationships where item vectors for similar items in the latent space will be located close together. Using the strength-of-like (e.g., discrete, continuous) data facilitates producing a latent space where the relationship between items is proportional to the strength-of-like data. Using both dis-like and strength-of-like data facilitates producing improved recommendations that consider not just whether a user has an item, but also how much the user likes (e.g., uses, plays, recommends) the item.

Consider a user that has played a first game for five hundred hours, played a second game for fifty hours, and played a third game for just half an hour. Conventional systems that only consider binary data may treat equally the relationships between the first game and second game, the first game and third game, and the second game and third game. However, there appears to be a better correlation between the first game and the second game for which conventional binary systems may not account. Using conventional approaches, if an item model that preserves true relationships between items is built using just the binary data, then the model will indicate that the second game and the third game are equally related to the first game because the hours of play are not factored into the model. Using conventional approaches, if an item model is built on just the continuous data, then the true relationships between the three items may not be preserved because even though the third game is played the least it is still a "liked" item when compared to other games that the user has not played at all. Building the combined usage matrix and then performing matrix factorization on the combined usage matrix facilitates preserving true item-item relationships and having the relationship between the items be proportional to the strength-of-like data.

Figure 1:
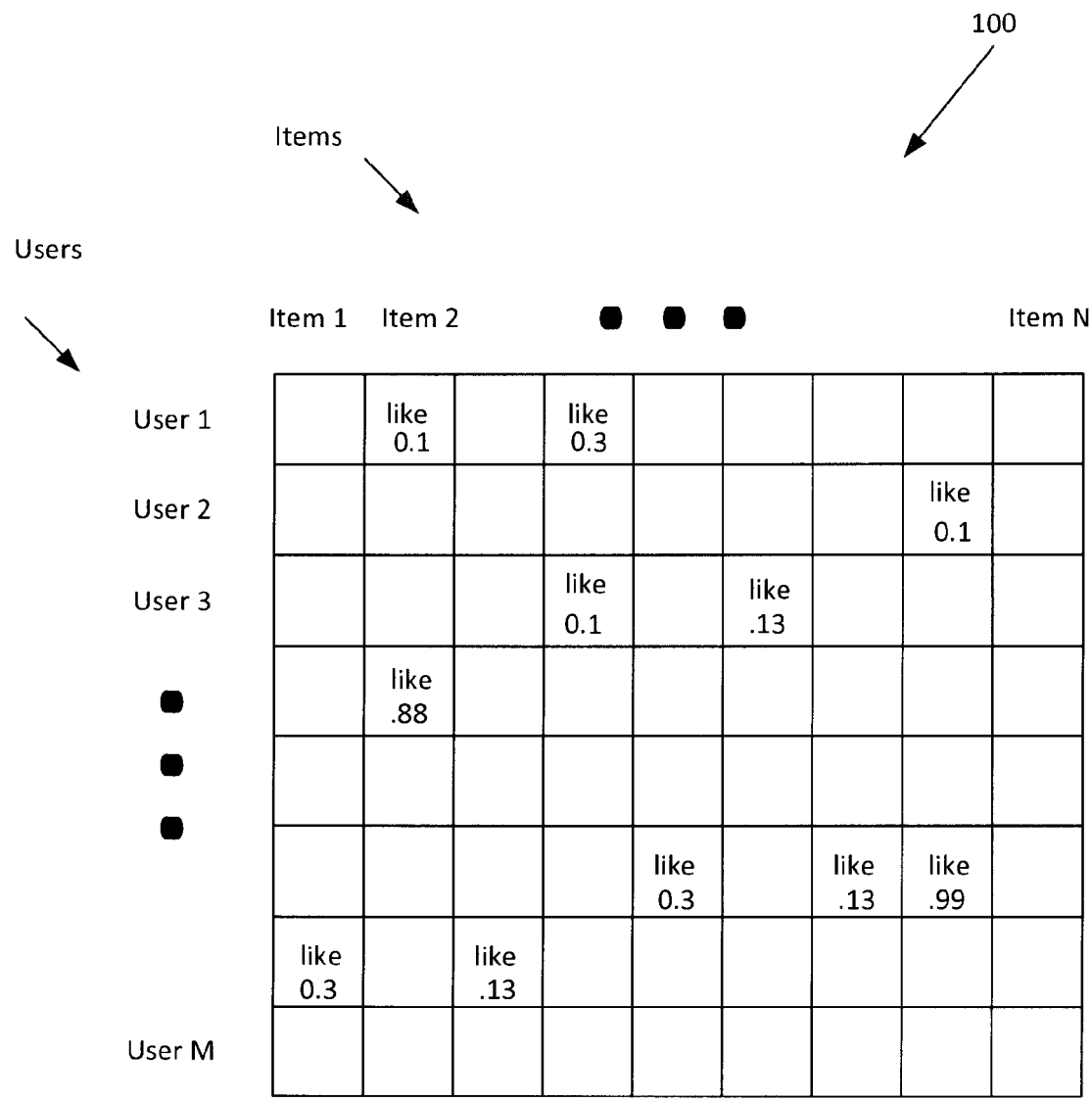
FIG. 1 illustrates an example usage matrix that includes both like/dislike and strength-of-like data.

FIG. 1 illustrates a usage matrix 100 whose entries are either empty, which indicates that the user has not established a relationship with the item, or populated with both a like value and a strength-of-like value. A data set may be used to generate the users-over-item usage matrix 100. The data set may be acquired, for example, from sales data from an online retailer. Rows in the usage matrix 100 may be associated with users and columns in the usage matrix 100 may be associated with items. Different organizations may be employed. The usage matrix 100 may be sparse, meaning that most of the cells are empty. An empty cell indicates that the dataset from which the usage matrix 100 is produced has no data indicating that a user has accessed (e.g., purchased, played, viewed, read) an item. A non-empty cell indicates that a user "liked" (e.g., purchased, played, viewed, read) the item. Not all liked items are equal. For example, a game that has been played for hundreds of hours over dozens of sessions may be liked more than a game that was played once for ten minutes and never played again. Similarly, a book that a user rated five out of five stars may be liked more than a book that a user rated one out of five stars. Usage matrix 100 includes a continuous score for liked items. The continuous score indicates how much the user liked the item. In one embodiment, the continuous score may be the amount of time a user played a specific item as compared to other items. In other embodiments, the continuous score may be based on other factors (e.g., number of times shared, number of times viewed, amount of time watched, number of copies purchased). More generally, the continuous data associated with the strength-of-like may be based on a signal that exposes the strength of the relationship between the user and the item.

Usage matrix 100 is different from conventional usage matrices because it includes both dis-like data, which may be binary or one-sided, and strength-of-like data, which may be continuous or discrete. Conventional usage matrices typically include only binary data or only continuous data, but not both.

Matrix factorization is the process by which a sparse usage matrix is converted into a latent item model. Example apparatus and methods employ a matrix factorization approach that processes a usage matrix having at least two different types of data, for example, both binary data and continuous data. The latent item model is the product of the matrix factorization. The item model is a latent representation of the items for which data appeared in the usage matrix. In the latent item model, an item is represented by a low dimensional vector. In one embodiment, the low dimensional vector may have twenty dimensions. In the latent item model, vectors belonging to similar items will point in similar directions. The similar directionality between similar items exposes relationships between items and may also reveal clusters of similar items that may then be recommended to a user based on the strength of their like of a similar item.

Figure 2:
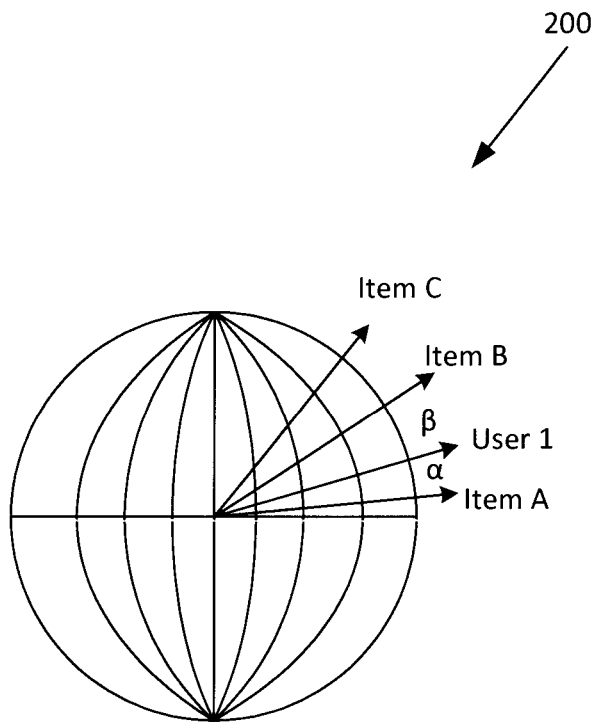
FIG. 2 illustrates an example latent space.

FIG. 2 illustrates a latent space 200 where the distance between items is defined by angles. For example, the distance between a first vector and a second vector may be measured by angle α and the distance between the second vector and a third vector can be measured by β. The distance between items may describe, for example, how similar the items are. The distance between users and items may describe, for example, how likely it is that a user will like an item. While distance is illustrated being measured by angles, other distance measuring approaches may be applied. Conventionally, the latent space 200 may have been created by performing matrix factorization on a user to item matrix and thus the distance between a user item and vector item could be found. Example apparatus and methods learn a latent representation of item vectors from matrix factorization performed on a usage matrix that includes both relationship indication data and relationship characterizing data.

Figure 9:
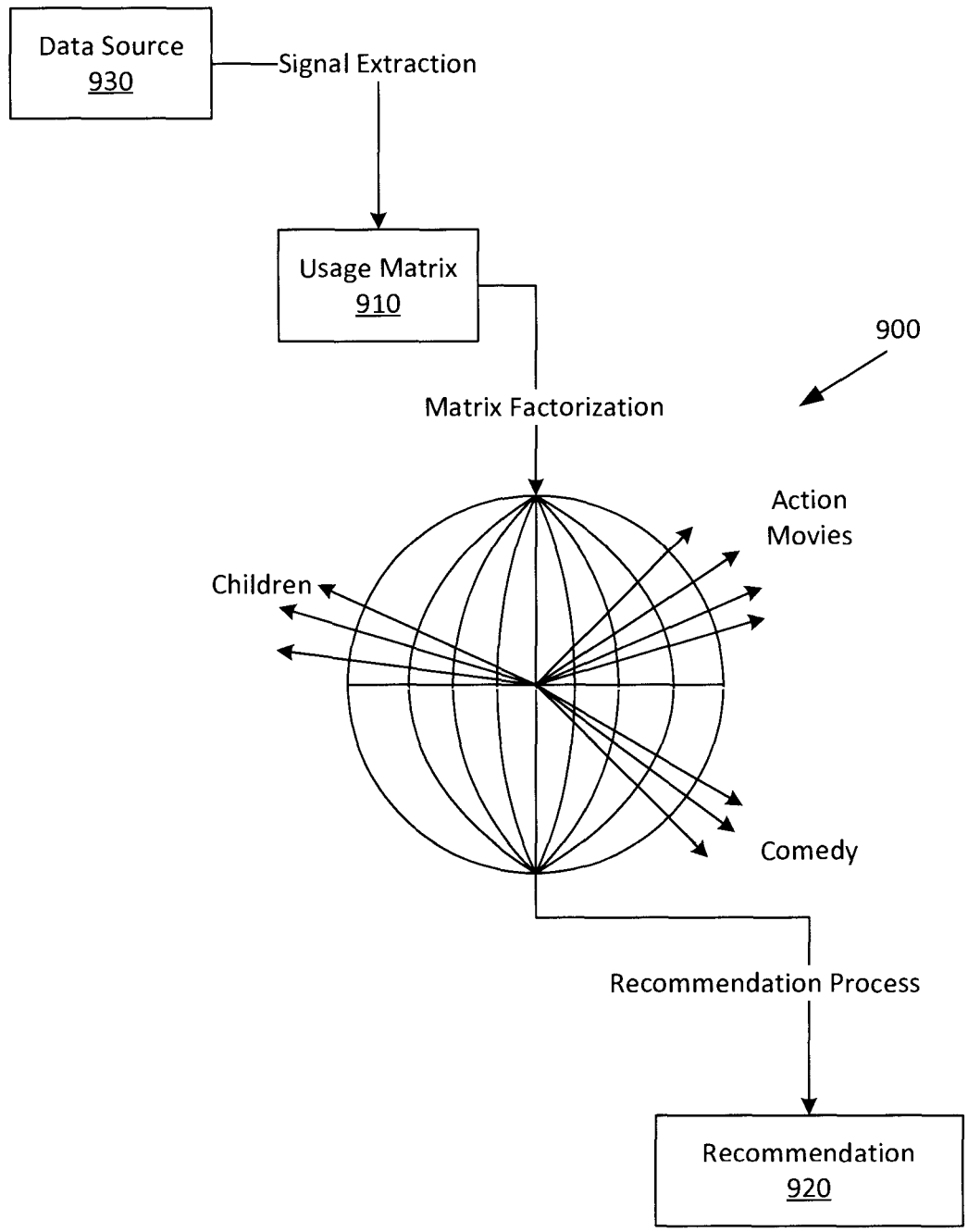
FIG. 9 illustrates signal extraction, matrix factorization, and recommendation production in a system that makes a recommendation based on dual collaborative filter data.

FIG. 9 illustrates a latent item model 900 that may be produced by performing matrix factorization on a usage matrix 910. Usage matrix 910 may have been populated with data extracted from data source 930. Data source 930 may store, for example, sales data, viewing data, game play data, or other data. Data source 930 may include one or more sets of data. For example, a first set of binary data may record the existence of a relationship between a user and an item. A second set of continuous data may record the nature of the relationship. For example, the first set of data may record the fact that a user licensed an online video game and the second set of data may record the number of hours the user has played the game. Item model 900 shows a clustering of movies according to genres (e.g., action, comedy, kids). While movies are illustrated, different types of items may have data in usage matrix 910 and thus may be represented by vectors in the latent item model 900. For example, video games may be clustered based on subject matter (e.g., sports, first person shooter, quest, simulator). Regardless of the type of item (e.g., movie, book, game), applying the matrix factorization approach described herein on usage matrix 910 that includes both dis-like data represented by binary or single-sided values and strength-of-like data represented by discrete or continuous data facilitates automatic production of the item model 900 from collaborative filter usage signals rather than from arbitrary metadata. The automatic production may lead to discovering unexpected or even surprising relationships between items, which may in turn lead to more insightful and improved recommendations 920. The more insightful and improved recommendations 920 may be generated from the item model 900 in light of the specific history of a user.

Example apparatus and methods factorize a matrix that includes two different types of data (e.g., binary data, continuous data). Conventional systems may factorize a matrix that includes only a single type of data, either binary data or continuous data, but not both. Example apparatus and methods use a matrix factorization approach that simultaneously learns values for both types of data present in the usage matrix. In one embodiment, the matrix factorization approach employs a probabilistic Bayesian formulation.

Before examining the matrix factorization approach applied by example apparatus and methods to a usage matrix having different types of data (e.g., binary, continuous) that model both dis-like and strength-of-like signals, consider conventional approaches to matrix factorization on either just binary or just continuous data.

For a usage matrix that stores only binary data, the event that a user m likes some item n may be noted by $l_{mn}$=true, m and n being integers. The fact that the user m did not like item n may be noted by $l_{mn}$=false. The probability (Pr) of a user m liking an item n may be modeled by:

$$P_r(l_{mn}=\text{true}) = \sigma(u_m^T v_n),$$

where the vector $u_m$ is the representation of the user m in the latent space,
the vector $v_n$ is the representation of the item n in the latent space, and
σ(x) is the logistic sigmoid.

The probability of a user m disliking an item n may be given by:

$$P_r(l_{mn}=\text{false}) = 1 - P_r(l_{mn}=\text{true}) = 1 - \sigma(u_m^T v_n) = \sigma(-u_m^T v_n).$$

A binary usage matrix may note the like and dislike events for many different users and items. The joint probability of the like and dislike events for multiple (m,n) pairs may be considered together to produce the likelihood of the usage matrix. Bayes rule may then be applied to find the probability of the user and item vectors given the data. The vectors for the latent item space may then be learned using a learning algorithm (e.g., Variational Bayes, maximum a posteriori (MAP)). The item model is then built from the item vectors. Recall that in this example the item model is based on binary data only and therefore, while the item model may preserve true item-item relationships, this model may not factor a strength-of-like (e.g., continuous usage) between items.

For a usage matrix that stores only continuous data, a conventional system may denote by $s_{mn}$ the score of user m to some item n. The probability that a user m will have a score of $s_{mn}$ to the item n may be given by:

$$P_r(s_{mn}) = \mathcal{N}(s_{mn}; u_m^T v_n, \lambda^{-1}),$$

where $\mathcal{N}(x;\mu,\lambda^{-1})$ is a Gaussian function with mean μ and variance $\lambda^{-1}$.

In this continuous data model, the mean may be set to $\mu = u_m^T v_n$. Similar to the binary case, the likelihood of the data may be produced by considering multiple probabilities associated with multiple (m,n) pairs. The likelihood may then be used to learn the item model using Bayes rule or other techniques. Recall that in this example the item model is based on continuous data only and thus may not preserve true item-item relationships.

Example apparatus and methods employ a usage matrix that is associated with at least two different types of data. For example, a usage matrix may include both dis-like data that is represented using binary signals or one-sided signals and may also include strength-of-like data that is represented using scores, discrete values, or continuous values. More generally, the usage matrix may include a first type of data (e.g., binary) that indicates the existence of a relationship between a user and an item. The usage matrix may also include a second type of data (e.g., continuous) that characterizes the nature of the relationship indicated by the first type of data. The continuous data may facilitate accounting for the level of user engagement with an item. For example, the continuous data may measure the amount of time spent with an item. In one embodiment, a usage matrix may also include a third type of data (e.g., discrete) that provides an explicit ranking for an item by a user. Example apparatus and methods may use a matrix factorization approach that models different types of signals with the same set of user and item vectors. Example apparatus and methods introduce an additional scaling parameter to the scoring approach for continuous data that allows the vectors to operate in both the binary and continuous scales. In this approach, the probability that $l_{mn}$=true may be modeled according to:

$$P_r(l_{mn}=\text{true})=\sigma(u_m^T v_n)$$

and the probability of a score $s_{mn}$ may be modeled according to:

$$P_r(s_{mn})=\mathcal{N}(s_{mn};\alpha u_m^T v_n,\lambda^{-1}).$$

Note that the continuous signal has the additional scalar α that permits the user and item vectors to scale differently. A likelihood function that encodes both signals can be produced from the joint probability of the like events, dislike events, and scores. Bayes rule may then be employed to learn the item vectors as well as the scalar α. In this model, the item vectors that make up the item model are based on both the dis-like (e.g., binary) as well as the strength-of-like (e.g., continuous) signal. Therefore, the item model is more accurate, which in turn leads to more accurate recommendations as well as a better understanding of the relations between items.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
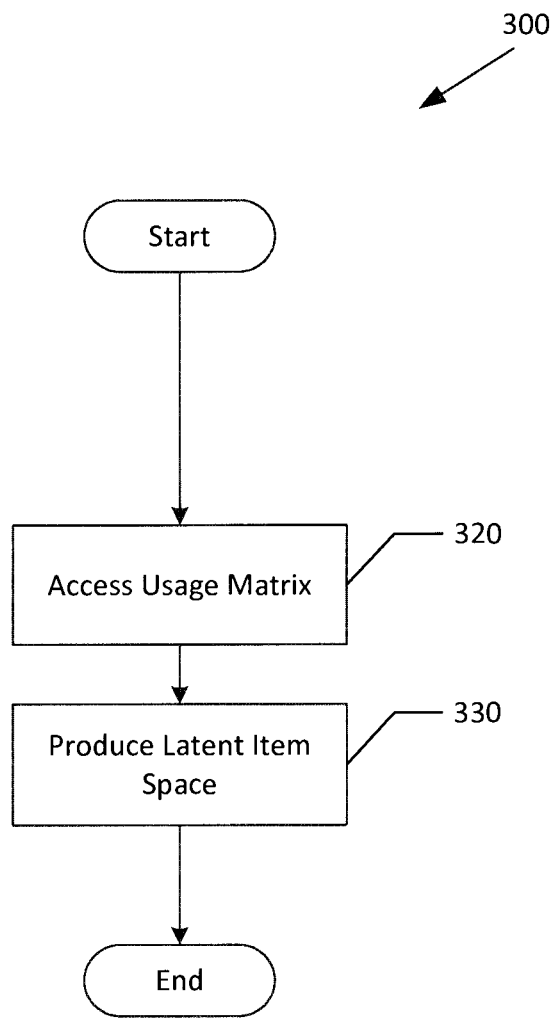
FIG. 3 illustrates an example method for making a recommendation based on dual collaborative filter data.

FIG. 3 illustrates an example method 300 associated with producing a latent item space by applying matrix factorization to a usage matrix having at least two types of data provided by collaborative filtering. The two types of data may be, for example, binary data that identifies whether a user has a relationship with an item and continuous data that describes the nature (e.g., strength, continuous engagement) of the relationship. Method 300 may include, at 320, accessing a usage matrix M. Usage matrix M may store first electronic data concerning a set of users and a set of items. The users may be, for example, purchasers of content (e.g., movie, book, ebook, television show), viewers of content, players of video games, or other users. The first electronic data may describe user-to-item interactions using first collaborative filter data that describes the existence of a relationship between a user and an item. The first collaborative filter data may be, for example, binary data that represents the existence of a relationship with a "true" value (e.g., 1) and that represents the lack of a relationship with an empty cell or with a "false" value (e.g., 0). The first electronic data may also include second collaborative filter data that characterizes a strength of the relationship. The second collaborative filter data may be, for example, continuous data. For example, the second collaborative filter data may describe continuous user engagement with a video game (e.g., hours played in current session), may describe cumulative user engagement with a video game (e.g., total hours played), or may describe other data that facilitates understanding the strength of the relationship between the user and the item.

Method 300 may also include, at 330, producing second electronic data associated with a latent item space. The second electronic data may be produced from M using matrix factorization and a likelihood function. The likelihood function may encode both the first collaborative filter data and the second collaborative filter data. In one embodiment, the second electronic data is produced so that the latent item space reflects true relationships between items represented in M. The second electronic data may also be produced so that a relationship in the latent item space between a first item and a second item is proportional to the strength of the relationship described in the second collaborative filter data.

The likelihood function may be based on probabilities for two or more user/item pairs in the usage matrix. A first probability describes the likelihood of the existence of the relationship between the user and the item and a second probability describes the likelihood of a strength value between the user and the item. The first probability may be computed by:

$$P_r(l_{mn}=\text{true})=\sigma(u_m^T v_n),$$

where the vector $u_m$ is a representation of m in the latent item space, the vector $v_n$ is a representation of n in the latent item space, and σ(x) is the logistic sigmoid. The second probability may be computed by:

$$P_r(s_{mn})=\mathcal{N}(s_{mn};\alpha u_m^T v_n,\lambda^{-1}),$$

where $s_{mn}$ is the strength of the relationship between m and n, $\mathcal{N}(x;\mu,\lambda^{-1})$ is a Gaussian function with mean μ and variance $\lambda^{-1}$, and α is a scalar.

Once the likelihood function has been established, then a learning algorithm (e.g., Variational Bayesian, MAP) may be applied to the usage matrix during matrix factorization to learn new item vectors that are represented in the second electronic data. The learning algorithm may also learn the value of α.

Figure 10:
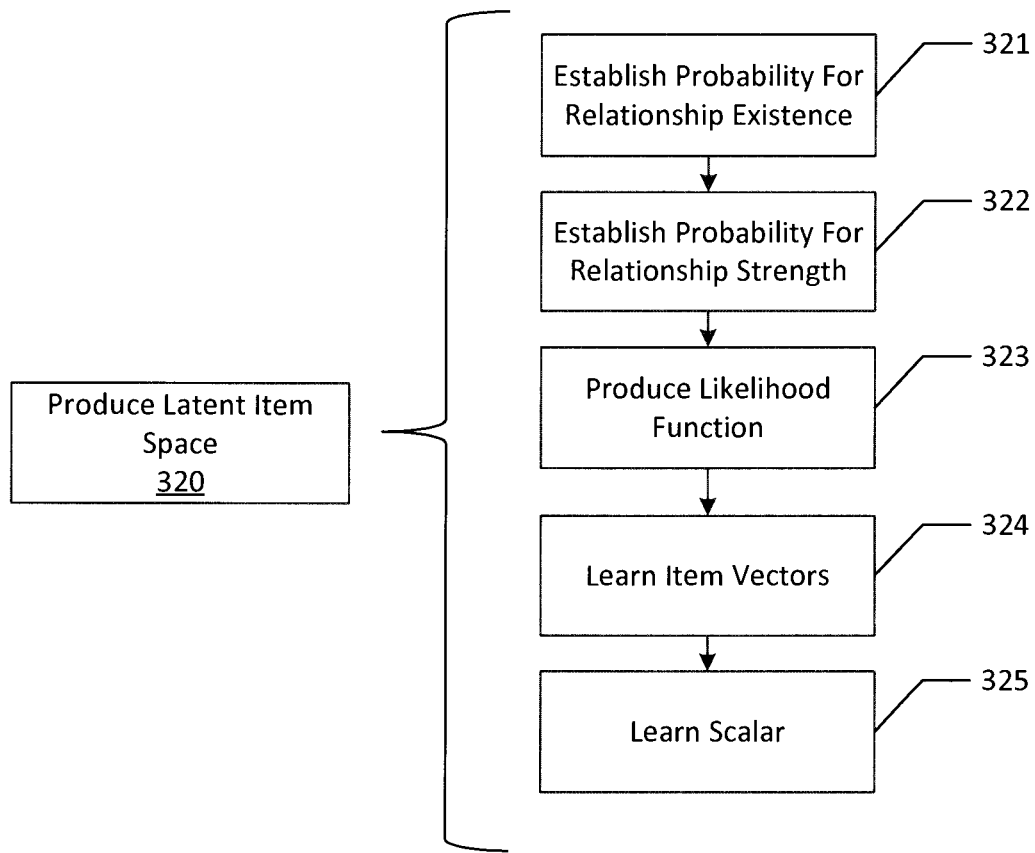
FIG. 10 illustrates additional detail for a portion of an example method.

FIG. 10 provides additional detail for one embodiment of producing second electronic data associated with a latent item space at 320. Producing the second electronic data for the latent item space may include, at 321, establishing the probability function for the existence relationship. Producing the second electronic data may also include, at 322, establishing the probability function for the strength of the relationship. Producing the second electronic data may also include, at 323, producing the likelihood function. In one embodiment, the likelihood function may be based on existence probabilities and strength probabilities from two or more user-item pairs. In one embodiment, the likelihood function may be based on existence probabilities and strength probabilities from all user-item pairs. In one embodiment the likelihood function may be based on existence probabilities and strength probabilities from a sample of user-item pairs. Producing the second electronic data may also include, at 324, learning item vectors. The item vectors may be learned through matrix factorization. The matrix factorization may include performing a Bayesian learning algorithm. Producing the second electronic data may also include, at 325, learning the scalar α. Learning the scalar α may also involve performing a Bayesian learning algorithm.

Figure 4:
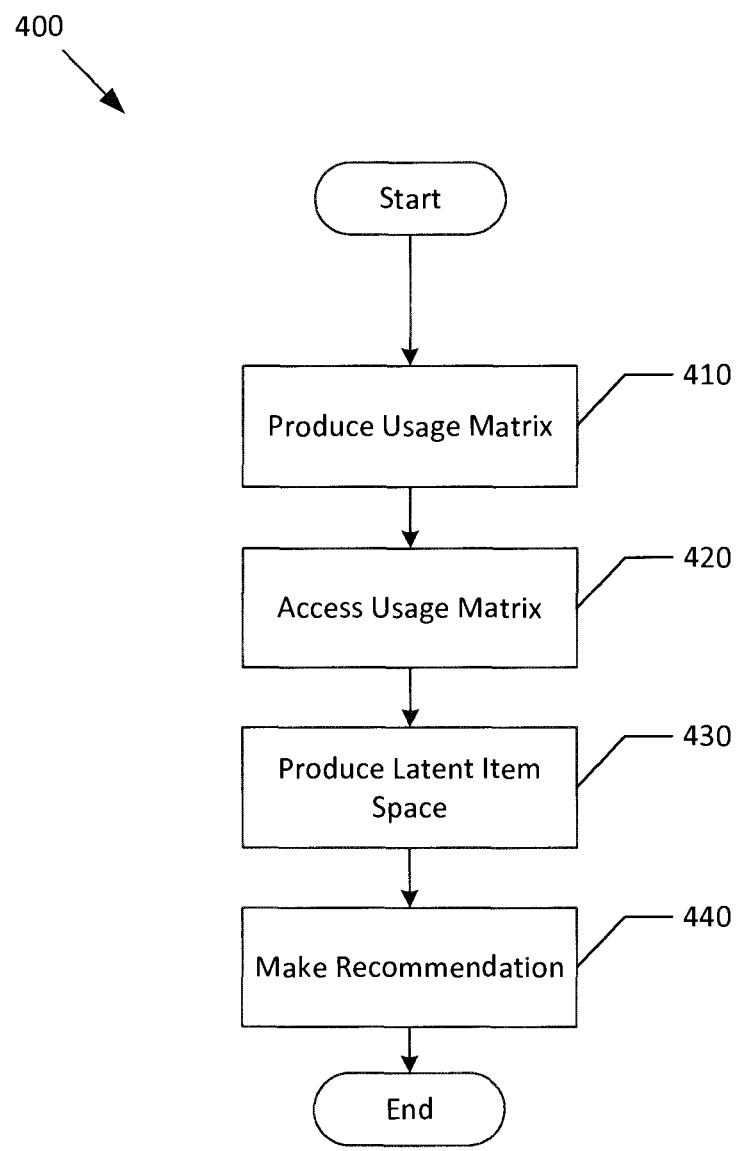
FIG. 4 illustrates an example method for making a recommendation based on dual collaborative filter data.

FIG. 4 illustrates another example method 400 associated with making a recommendation based on a latent item space produced by applying matrix factorization to a usage matrix having at least two types of data provided by collaborative filtering. Method 400 includes several actions similar to method 300. For example, method 400 includes accessing the usage matrix at 420 and producing the second electronic data at 430. However, method 400 includes additional actions. For example, method 400 includes, at 410, populating the usage matrix with data from one or more collaborative filters. Populating the usage matrix may include accessing online sales data, accessing warehoused sales data, accessing video game usage data, accessing content viewing data, or other actions. Populating the usage matrix may include translating raw data in a data source (e.g., sales data) into binary data or continuous data. Recall that collaborative filtering involves collecting actual data that reflects the preferences or taste information from users.

Method 400 may also include, at 440, producing a recommendation for an item to acquire based, at least in part, on the second electronic data. The recommendation may take the "if you liked this you might also like this" form. A recommendation may be based on a relationship between a user and an item that is captured in the second electronic data. A recommendation may also be based on a relationship between two or more items that is captured in the second electronic data.

While FIGS. 3 and 4 illustrates various actions occurring in serial, it is to be appreciated that various actions illustrated in FIGS. 3 and 4 could occur substantially in parallel. By way of illustration, a first process could produce the first electronic data for the combined data usage matrix, a second process could perform matrix factorization on the combined data usage matrix to produce the second electronic data associated with the item model, and a third process could produce recommendations from the improved item model. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, read only memory (ROM), and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, a compact disk (CD), a random access memory (RAM), a read only memory (ROM), a memory chip or card, a memory stick, and other media from which a computer, a processor or other electronic device can read.

Figure 5:
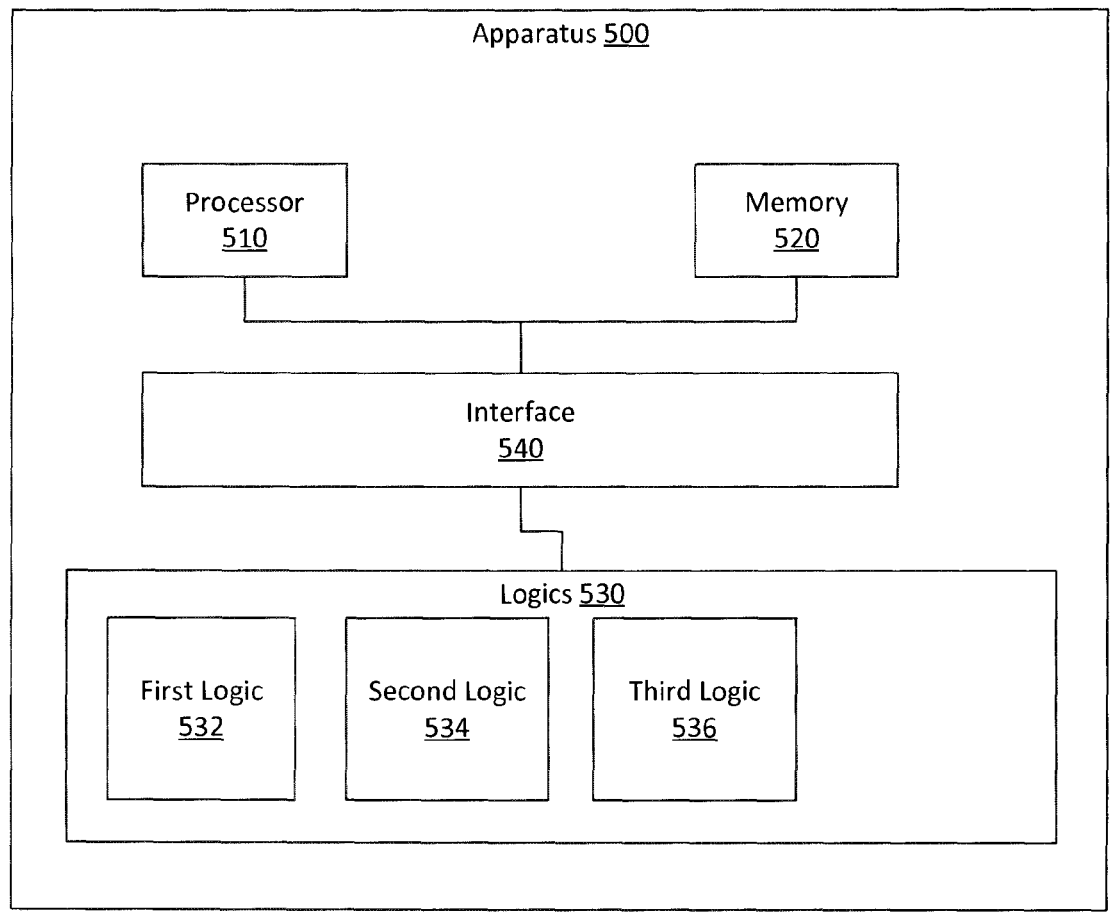
FIG. 5 illustrates an example apparatus associated with making a recommendation based on dual collaborative filter data.

FIG. 5 illustrates an apparatus 500 that produces a recommendation based on a usage matrix that includes at least two types of data from collaborative filtering. Apparatus 500 may include a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated circuit (ASIC), a processor in a mobile device, a system-on-a-chip, a dual or quad processor, or other computer hardware. The memory 520 may store data (e.g., vector $m_i$) representing a user i, may store data (e.g., vector $m_j$) representing an item j, may store data relating a user to an item, or may store other data. Memory 520 may store data associated with making a recommendation based on data produced from a usage matrix that stores both binary and continuous data.

In one embodiment, the apparatus 500 may be a general purpose computer that has been transformed into a special purpose computer through the inclusion of the set 530 of logics. Apparatus 500 may interact with other apparatus, processes, and services through, for example, a computer network. Apparatus 500 may be, for example, a computer, a laptop computer, a tablet computer, a personal electronic device, a smart phone, a system-on-a-chip (SoC), or other device that can access and process data.

The set 530 of logics may facilitate producing improved recommendations from data that represents both a dis-like value and a strength-of-like value. The set 530 of logics may produce data upon which a recommendation for an item to acquire can be made. The data may be associated with, for example, a latent space that facilitates identifying distances between vectors that represent users and items.

The set 530 of logics may include a first logic 532 that accesses a collaborative filtering based user-item usage matrix M. Usage matrix M stores at least two different types of data. The first type of data may be, for example, binary data. The second type of data may be, for example, continuous data. In one embodiment, the usage matrix M may even store a third type of data (e.g., discrete data).

The first logic 532 may access a collaborative filtering based user-item usage matrix M that stores the first type of data and the second different type of data. The first type of data and the second type of data may be provided from one or more collaborative filtering processes. In one embodiment, the first type of data stores values $l_{mn}$ that describe whether a user m likes an item n. The binary data may record the existence of a relationship between m and n using the value $l_{mn}$=true. The second type of data may store values $S_{mn}$ that describe the strength with which user m likes item n. The strength may be associated with, for example, how many hours a gamer has played a game, how many times a user has viewed a piece of content, how many hours a reader has spent reading an ebook, or other continuous data. For example, $S_{mn}$ may represent an amount of time a video game n was played by m, an amount of time content n was viewed by m, or other measured data. In one embodiment, $S_{mn}$ may be discrete data. For example, $S_{mn}$ may represent a score assigned to n by m. The score may be, for example, a number of stars (e.g., 3 out of 5).

In one embodiment, the first logic 532 may populate the usage matrix M. Populating the usage matrix M may include acquiring binary data from a first source and acquiring continuous data acquired from the first source or from a second source. In one embodiment, the first source and second source may be located in a single data store. In another embodiment, the first source and second source may be located in separate data stores. The first source may be, for example, online shopping data. The second source may be, for example, online game play tracking data.

The set 530 of logics may also include a second logic 534 that establishes a first probability that m likes n as $P_r(1_{mn}=\text{true})=\sigma(u_m^T v_n)$. $u_m$ is the vector representation of m in the latent space item model. $v_n$ is the vector representation of n in the latent space item model. $\sigma(x)$ is the logistic sigmoid. The probability that m likes n may be modelled different ways in different embodiments. The second logic 534 may also establish a second probability that the relationship between m and n has a strength $s_{mn}$. The probability may be established as $P_r(s_{mn})=\mathcal{N}(s_{mn};\alpha u_m^T v_n,\lambda^{-1})$, where $\mathcal{N}(x;\mu,\lambda^{-1})$ is a Gaussian function with mean u and variance $\lambda^{-1}$, and $\alpha$ is a scalar. $\alpha$ allows the two different probability expressions to scale. The second logic 534 may also produce a likelihood function L for M based on joint probabilities $P_r(1_{mn})$ and $P_r(s_{mn})$ for two or more (m,n) pairs. L is crafted to encode values for both the first type of data and the second type of data. In one embodiment, L may be based on a sample of less than all (m,n) pairs in M. In one embodiment, L may be based on all (m,n) pairs in M.

The set 530 of logics may also include a third logic 536 that learns one or more item vectors and $\alpha$ by performing matrix factorization on M using L. The third logic 536 may also produce the latent space item model from the one or more item vectors. The third logic 536 produces the latent space item model so that true relationships between items represented in M are preserved. The third logic 536 also produces the latent space item model so that relationships between items in the latent space item model are proportional to values in the second type of data. In one embodiment, the third logic 536 learns the one or more vectors and $\alpha$ using a variational Bayesian approach. In another embodiment, the third logic 536 learns the one or more vectors and $\alpha$ using a maximum a posteriori (MAP) approach.

Figure 6:
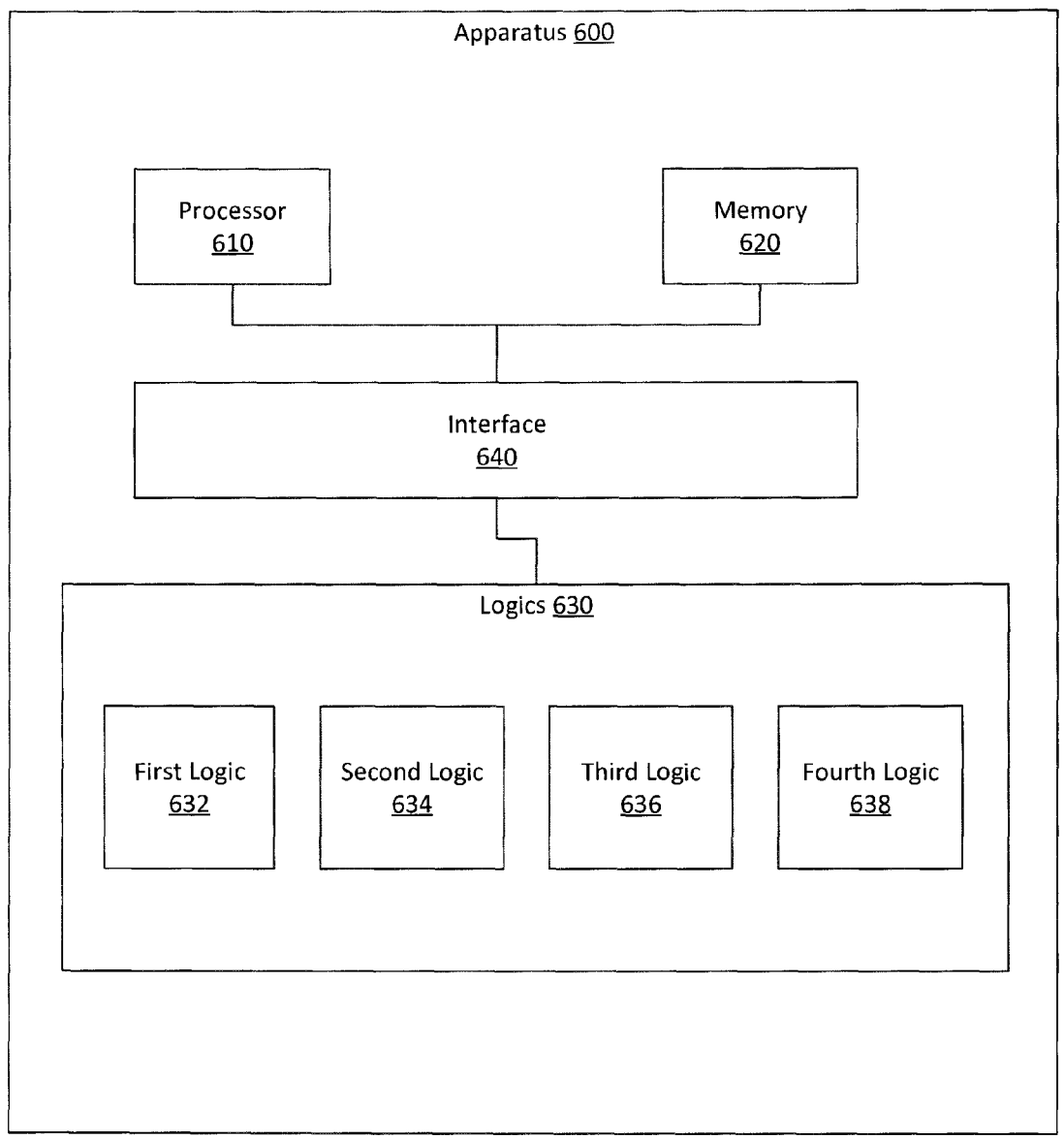
FIG. 6 illustrates an example apparatus associated with making a recommendation based on dual collaborative filter data.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. Fourth logic 638 may produce a recommendation for an item to acquire. The recommendation may be based, at least in part, on the improved latent item model. The recommendation may be made with respect to a single item associated with a user, with respect to a plurality of items associated with a user, with respect to a single item associated with a plurality of users, or with respect to a plurality of items associated with a plurality of users.

Figure 7:
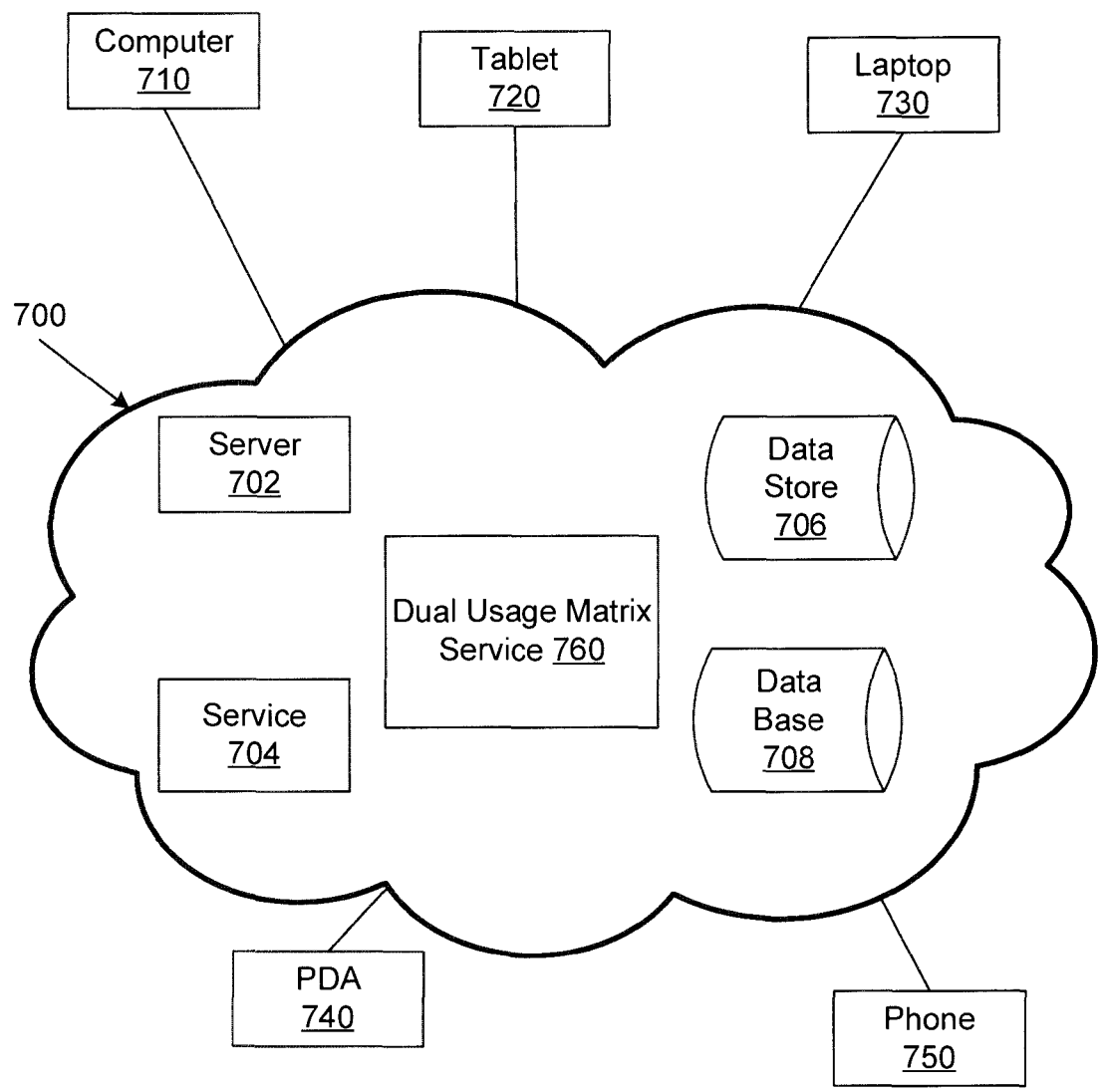
FIG. 7 illustrates an example cloud operating environment in which a recommendation system that makes a recommendation based on dual collaborative filter data may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example dual usage matrix service 760 residing in the cloud. The dual usage matrix service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the dual usage matrix service 760.

FIG. 7 illustrates various devices accessing the dual usage matrix service 760 in the cloud. The devices include a computer 710, a tablet 720, a laptop computer 730, a personal digital assistant 740, and a mobile device (e.g., cellular phone, satellite phone, wearable computing device) 750. The dual usage matrix service 760 may produce a recommendation for a user concerning a potential acquisition (e.g., purchase, rental, borrowing). The dual usage matrix service 760 may produce data from which the recommendation may be made. The data may be produced by performing matrix factorization on a usage matrix that includes at least two types of data provided by collaborative filtering. The two types of data may include a like/dislike value that is encoded with binary or single-sided data. The two types of data may also include a strength-of-like or just strength value that is encoded with continuous or discrete data.

It is possible that different users at different locations using different devices may access the dual usage matrix service 760 through different networks or interfaces. In one example, the dual usage matrix service 760 may be accessed by a mobile device 750. In another example, portions of dual usage matrix service 760 may reside on a mobile device 750.

Figure 8:
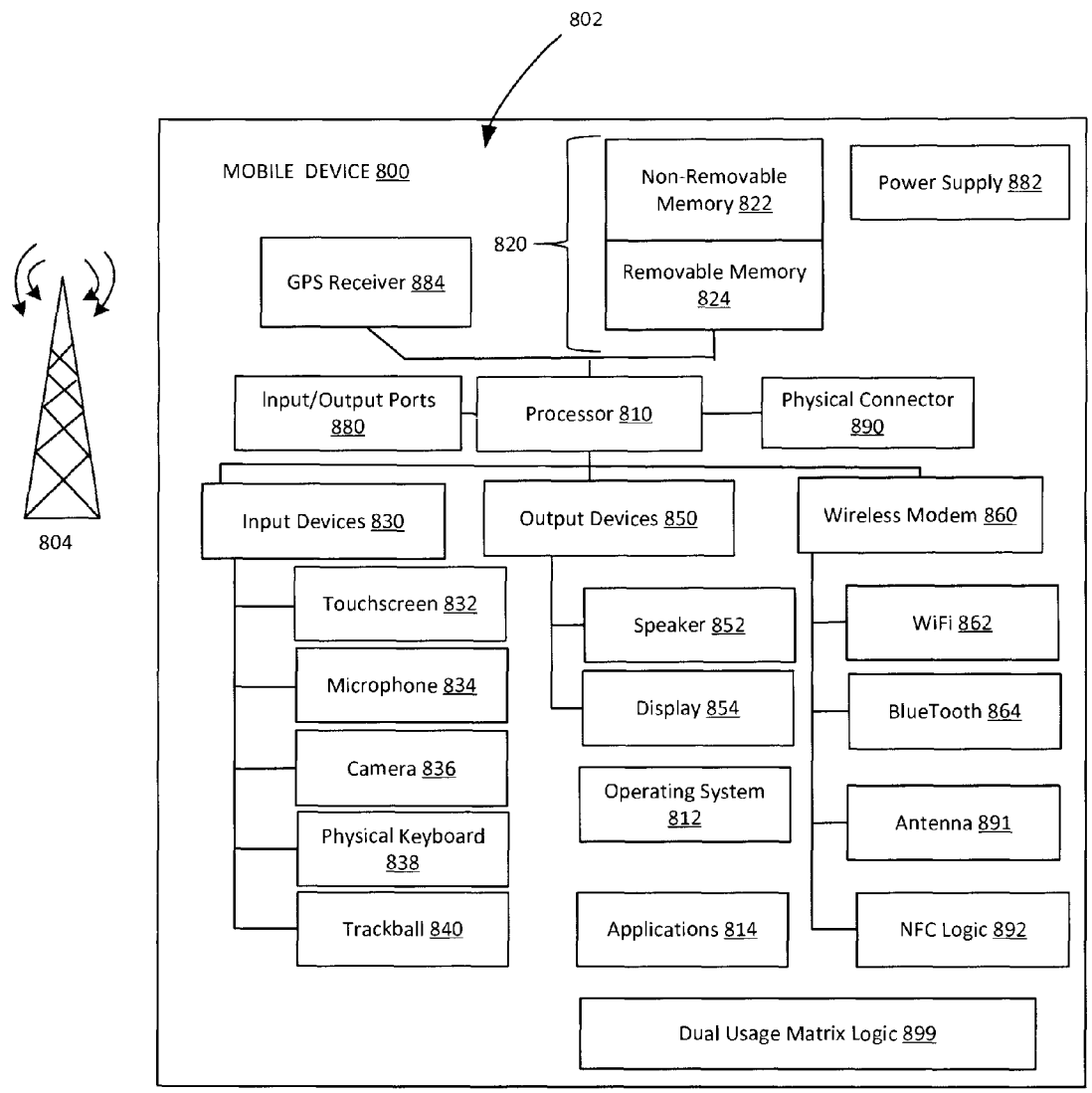
FIG. 8 is a system diagram depicting an exemplary mobile communication device that participates in making a recommendation based on dual collaborative filter data.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite network.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include recommendation applications, user activity applications, recommendation applications, matrix factorization applications, mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include user vectors, item vectors, latent space data, recommendations, sales analytics data, like data, strength of like data, or other data. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input to a recommendation application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC).

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include dual usage matrix logic 899 that provides a functionality for the mobile device 800. For example, dual usage matrix logic 899 may provide a client for interacting with a service (e.g., service 760, FIG. 7). Portions of the example methods described herein may be performed by dual usage matrix logic 899. Similarly, dual usage matrix logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store electronic data. A data store may be, for example, a database, a table, a file, a list, a queue, a heap, a memory, a register, and other physical repository. In different examples, a data store may reside in one logical or physical entity or may be distributed between two or more logical or physical entities. Storing electronic data in a data store causes a physical transformation of the data store.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor;
   a memory to store recommendation data associated with a recommendation of an item to acquire;
   a set of logics that produce a latent space item model Q upon which the recommendation may be based; and
   an interface to connect the processor, the memory, and the set of logics;
   the set of logics comprising:
      a first logic that:
         accesses a collaborative filtering based user-item usage matrix M that stores a first type of data and stores a second different type of data, where the first type of data and the second type of data are provided from one or more collaborative filtering processes, where the first type of data stores values $l_{mn}$ that describe whether a user m likes an item n, and where the second type of data stores values $S_{mn}$ that describe the strength with which m likes n;
      a second logic that:
         establishes a first probability that m likes n as $P_r(l_{mn}=\text{true})=\sigma(u_m^T v_n)$, where the vector $u_m$ is a representation of m in Q, where the vector $v_n$ is a representation of n in Q, and where $\sigma(x)$ is the logistic sigmoid;
         establishes a second probability that the relationship between m and n has a strength $s_{mn}$ as $P_r(s_{mn})=\mathcal{N}(s_{mn};\alpha u_m^T v_n,\lambda^{-1})$, where $\mathcal{N}(x;\mu,\lambda^{-1})$ is a Gaussian function with mean μ and variance $\lambda^{-1}$, and where α is a scalar, and
         produces a likelihood function L for M based on joint probabilities $P_r(l_{mn})$ and $P_r(s_{mn})$ for two or more (m,n) pairs, where L encodes values for both the first type of data and the second type of data; and
      a third logic that:
         learns one or more item vectors and α by performing matrix factorization on M using L, and
         produces Q from the one or more item vectors, where Q preserves true relationships between items represented in M, and
      where relationships between items in Q are proportional to values in the second type of data.

2. The apparatus of claim 1, comprising a fourth logic that produces the recommendation of the item to acquire based, at least in part, on Q.

3. The apparatus of claim 2, where the first type of data is binary data.

4. The apparatus of claim 3, where the second type of data is continuous data.

5. The apparatus of claim 4, where $S_{mn}$ represents an amount of time a video game n was played by m.

6. The apparatus of claim 4, where $S_{mn}$ represents an amount of time content n was viewed by m.

7. The apparatus of claim 3, where $S_{mn}$ represents a score assigned to n by m.

8. The apparatus of claim 4, where M stores a third different type of data, the third different type of data being discrete data associated with $S_{mn}$.

9. The apparatus of claim 4, where the first logic populates the usage matrix M from binary data acquired from a first source and from continuous data acquired from a second source.

10. The apparatus of claim 9, where the binary data records the existence of a relationship between m and n using the value $l_{mn}=\text{true}$, and where the continuous data records a strength of the relationship between m and n using the value $S_{mn}$.

11. The apparatus of claim 4, where the third logic learns the one or more vectors and α using a variational Bayesian approach.

12. The apparatus of claim 4, where the third logic learns the one or more vectors and α using a maximum a posteriori (MAP) approach.

13. A method, comprising:
   accessing a usage matrix M that stores first electronic data concerning a set of users and a set of items, where the first electronic data describes user-to-item interactions using first collaborative filter data that describes the existence of a relationship between a user and an item and using second collaborative filter data that characterizes a strength of the relationship;
   producing, from M, using matrix factorization and a likelihood function that encodes both the first collaborative filter data and the second collaborative filter data, second electronic data associated with a latent item space, where the latent item space reflects true relationships between items represented in M and where a relationship between a first item and a second item in the latent item space is proportional to the strength of the relationship described in the second collaborative filter data.

14. The method of claim 13, the first collaborative filter data being binary data, the second collaborative filter data being continuous data.

15. The method of claim 14, where the likelihood function is based on probabilities for two or more user/item pairs, where a first probability describes the likelihood of the existence of the relationship between the user and the item and a second probability describes the likelihood of a strength value between the user and the item.

16. The method of claim 15, where the first probability is computed by:

$$P_r(l_{mn}=\text{true})=\sigma(u_m^T v_n),$$

where the vector $u_m$ is a representation of a user m in the latent item space,
where the vector $v_n$ is a representation of an item n in the latent item space, and
where $\sigma(x)$ is the logistic sigmoid, and
where the second probability is computed by:

$$P_r(s_{mn})=\mathcal{N}(s_{mn};\alpha u_m^T v_n,\lambda^{-1}),$$

where $s_{mn}$ is the strength of the relationship between m and n, where $\mathcal{N}(x;\mu,\lambda^{-1})$ is a Gaussian function with mean $\mu$ and variance $\lambda^{-1}$, and where $\alpha$ is a scalar.

17. The method of claim 16, where the second collaborative filter data describes continuous user engagement with a video game or describes cumulative user engagement with a video game.

18. The method of claim 16, comprising producing a recommendation for an item to acquire based, at least in part, on the second electronic data.

19. The method of claim 14, comprising populating the usage matrix with data from a first collaborative filter and with data from a second collaborative filter.

20. A computer-readable storage medium storing computer-executable instructions that when executed by a computer control the computer to perform a method, the method comprising:
accessing a usage matrix M that stores first electronic data concerning a set of users and a set of items, where the first electronic data describes user-to-item interactions using first collaborative filter data that describes the existence of a relationship between a user and an item and using second collaborative filter data that characterizes a strength of the relationship, the first collaborative filter data being binary data, the second collaborative filter data being continuous data that describes continuous user engagement with a video game or cumulative user engagement with a video game;
producing, from M, using matrix factorization and a likelihood function that encodes both the first collaborative filter data and the second collaborative filter data, second electronic data associated with a latent item space, where the latent item space reflects true relationships between items represented in M and where a relationship between a first item and a second item in the latent item space is proportional to the strength of the relationship described in the second collaborative filter data, and
producing a recommendation for a video game to acquire based, at least in part, on the second electronic data,
where the likelihood function is based on probabilities for two or more user/item pairs, where a first probability describes the likelihood of the existence of the relationship between the user and the item and a second probability describes the likelihood of a strength value between the user and the item,
where the first probability is computed by:

$$P_r(l_{mn}=\text{true})=\sigma(u_m^T v_n),$$

where the vector $u_m$ is a representation of a user m in the latent item space, where the vector $v_n$ is a representation of an item n in the latent item space, and where $\sigma(x)$ is the logistic sigmoid,
and
where the second probability is computed by:

$$P_r(s_{mn})=\mathcal{N}(s_{mn};\alpha u_m^T v_n,\lambda^{-1}),$$

where $s_{mn}$ is the strength of the relationship between m and n, where $\mathcal{N}(x;\mu,\lambda^{-1})$ is a Gaussian function with mean $\mu$ and variance $\lambda^{-1}$, and where $\alpha$ is a scalar.

* * * * *